United States Patent [19]
Saeki

[11] Patent Number: 5,974,212
[45] Date of Patent: Oct. 26, 1999

[54] OPTICAL LINE MONITOR AND OPTICAL AMPLIFICATION APPARATUS USING SAME

[75] Inventor: Miwa Saeki, Tokyo, Japan

[73] Assignee: NEC Corporation, Tokyo, Japan

[21] Appl. No.: 09/075,015

[22] Filed: May 8, 1998

[30] Foreign Application Priority Data

May 8, 1997 [JP] Japan ..................................... 9-118456

[51] Int. Cl.$^6$ ...................................................... G02B 6/34
[52] U.S. Cl. ................................. 385/37; 385/24; 385/31; 359/130; 359/333
[58] Field of Search .................................. 385/37, 24, 31, 385/39; 359/130, 333

[56] References Cited

U.S. PATENT DOCUMENTS

| | | | |
|---|---|---|---|
| 5,337,382 | 8/1994 | Mizrahi | 385/37 |
| 5,778,119 | 7/1998 | Farries | 385/37 |
| 5,796,764 | 8/1998 | Corsini et al. | 385/37 X |

FOREIGN PATENT DOCUMENTS

| | | |
|---|---|---|
| 6-148444 | 5/1994 | Japan . |
| 8-304859 | 11/1996 | Japan . |
| 8-330649 | 12/1996 | Japan . |

Primary Examiner—Phan T. H. Palmer
Attorney, Agent, or Firm—Scully, Scott, Murphy and Presser

[57] ABSTRACT

A line monitor comprising: an optical signal input section for permitting an optical signal to be input; optical signal output means for outputting an optical signal; a fiber grating including a section with a periodically varied refractive index, the optical signal, which has entered the section with a periodically varied refractive index, in its component with a predetermined specific wavelength being reflected while the remaining component of the optical signal is output from the optical signal output means; first optical signal withdrawal means for allowing the optical signal in its component with a specific wavelength to withdraw into the outside of the fiber grating; and photoelectric conversion means for converting the optical signal in its component with a specific wavelength taken out from the first optical signal withdrawal means to an electric signal. The section with a periodically varied refractive index is provided so as to incline against the central axis of the fiber grating, and the optical signal in its component with a specific wavelength is radiated from the side face of the fiber grating to take out the optical signal in its component with a specific wavelength. A plurality of the fiber gratings and a plurality of the first optical signal withdrawal sections corresponding respectively to the fiber gratings may be provided. This constitution can realize a small-size line monitor with low coupling loss. An optical amplification apparatus using this line monitor is also disclosed.

11 Claims, 4 Drawing Sheets

OPTICAL LINE MONITOR AND OPTICAL AMPLIFICATION APPARATUS USING SAME

FIELD OF THE INVENTION

The invention relates to an optical line monitor and an optical amplification apparatus, and more particularly, to an optical line monitor having the wavelength selectivity and an optical amplification apparatus using the same.

BACKGROUND OF THE INVENTION

A conventional line monitor comprises two optical fibers disposed opposite to each other, lenses for optically coupling the optical fibers to each other, a reflecting mirror disposed between the lenses, a lens for receiving light reflected from the reflecting mirror, and a photodetector for receiving light from the lens.

Light output from one optical fiber is brought to parallel beams by means of the lens, and a part thereof is vertically reflected by means of the reflecting mirror disposed at an angle of 45° to the direction of advance with the remaining component being passed through the mirror. The transmitted light is focused by means of the lens and coupled to the other optical fiber.

On the other hand, the reflected light is focused by means of the lens and coupled to the photodetector.

In the conventional optical line monitor, however, there is a disadvantage in that, since the branching film does not have the wavelength selectivity, when an optical signal containing a noise light with a wavelength different from that of the contemplated optical signal enters the line monitor, the noise light is also branched, often making it impossible to precisely monitor only the contemplated optical signal. An additional disadvantage of the conventional optical line monitor is such that when a plurality of optical signals in a wavelength multiplexed state are input, the optical signals with different wavelengths cannot be monitored separately from each other. Further, since the number of optical parts constituting the line monitor is large, it is difficult to reduce the size of the line monitor. Furthermore, the coupling loss is disadvantageously large because the optical signal goes out from an optical fiber into air and then again is introduced into the optical fiber.

SUMMARY OF THE INVENTION

Accordingly, it is an object of the invention to provide an optical line monitor in which only an optical signal is precisely monitored, and a plurality of optical signals are separately monitored for a wavelength division multiplexed signal.

It is another object of the invention to provide an optical line monitor which is made small in size by using a decreased number of optical parts It is a further object of the invention to provide an optical line monitor in which there is no necessity to optically couple two optical fibers.

It is a still further object of the invention to provide an optical amplification apparatus using the aforementioned optical line monitor.

According to the first feature of the invention, an optical line monitor, comprises:

an optical signal input section for permitting an optical signal to be input;

optical signal output means for outputting an optical signal;

a fiber grating including a section with a periodically varied refractive index, the optical signal, which has entered the section with a periodically varied refractive index, in its component with a predetermined specific wavelength being reflected while the remaining component of the optical signal is output from the optical signal output means;

first optical signal withdrawal means for allowing the optical signal in its component with a specific wavelength to withdraw into the outside of the fiber grating; and photoelectric conversion means for converting the optical signal in its component with a specific wavelength taken out from the first optical signal withdrawal means to an electric signal.

According to the second feature of the invention, an optical amplification apparatus, comprises:

an optical amplifier for amplifying an input optical signal containing light with a specific central wavelength and outputting the amplified optical signal;

a line monitor for permitting the amplified optical signal to be input, taking out the light with a specific central wavelength from the amplified optical signal, and converting the light with a specific central wavelength to an electric signal, said line monitor comprising an optical signal input section for permitting an optical signal to be input, optical signal output means for outputting an optical signal, a fiber grating including a section with a periodically varied refractive index, the optical signal, which has entered the section with a periodically varied refractive index, in its component with a predetermined specific wavelength being reflected while the remaining component of the optical signal is output from the optical signal output means, first optical signal withdrawal means for allowing the optical signal in its component with a specific wavelength to withdraw into the outside of the fiber grating, and photoelectric conversion means for converting the optical signal in its component with a specific wavelength taken out from the first optical signal withdrawal means to an electric signal; and optical amplifier control means for controlling the gain of the optical amplification apparatus based on the electrical signal.

BRIEF DESCRIPTION OF THE DRAWINGS

The invention will be explained in more detail in conjunction with appended drawings, wherein.

DESCRIPTION OF THE PREFERRED EMBODIMENTS

Before explaining an optical line monitor in the preferred embodiment according to the invention, the aforementioned conventional optical line monitor will be explained in FIG. 1.

Figure 1:
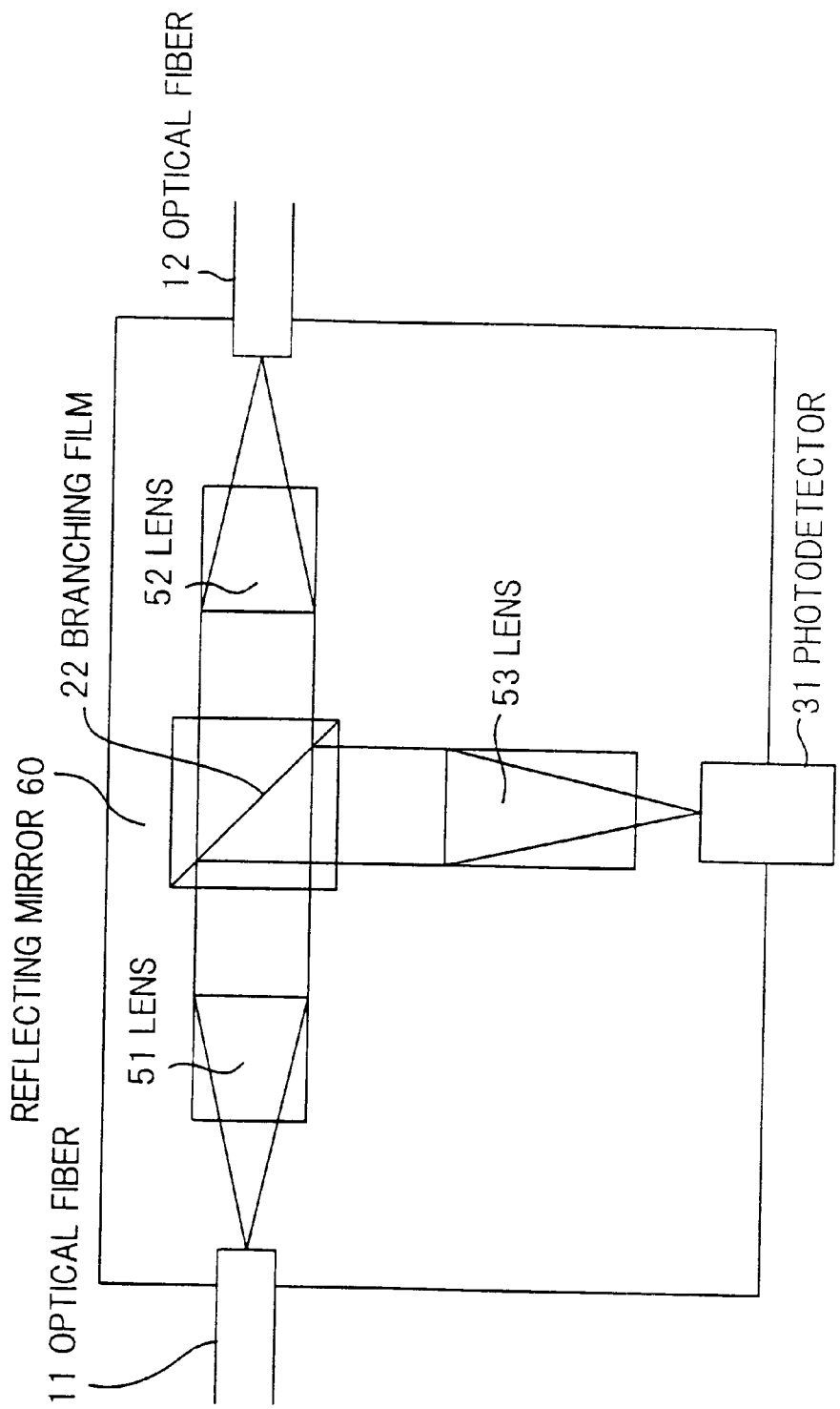
FIG. 1 is an explanatory view of a conventional line monitor.

In FIG. 1, a conventional optical line monitor comprises two optical fibers 11 and 12 disposed opposite to each other, lenses 51 and 52 for optically coupling the optical fibers 11 and 12 to each other, a reflecting mirror 60 disposed between the lenses 51 and 52, a lens 53 for receiving light reflected from the reflecting mirror 60, and a photodetector 31 for receiving light from the lens 53.

Light output from the optical fiber 11 is brought to parallel beams by means of the lens 51, and a part thereof is vertically reflected by means of the reflecting mirror disposed at an angle of 45° to the direction of advance with the remaining component being passed through the mirror. The transmitted light is focused by means of the lens 52 and coupled to the optical fiber.

On the other hand, the reflected light is focused by means of the lens 53 and coupled to the photodetector 31.

Next, an optical line monitor in the preferred embodiment according to the invention will be explained.

Figure 2:
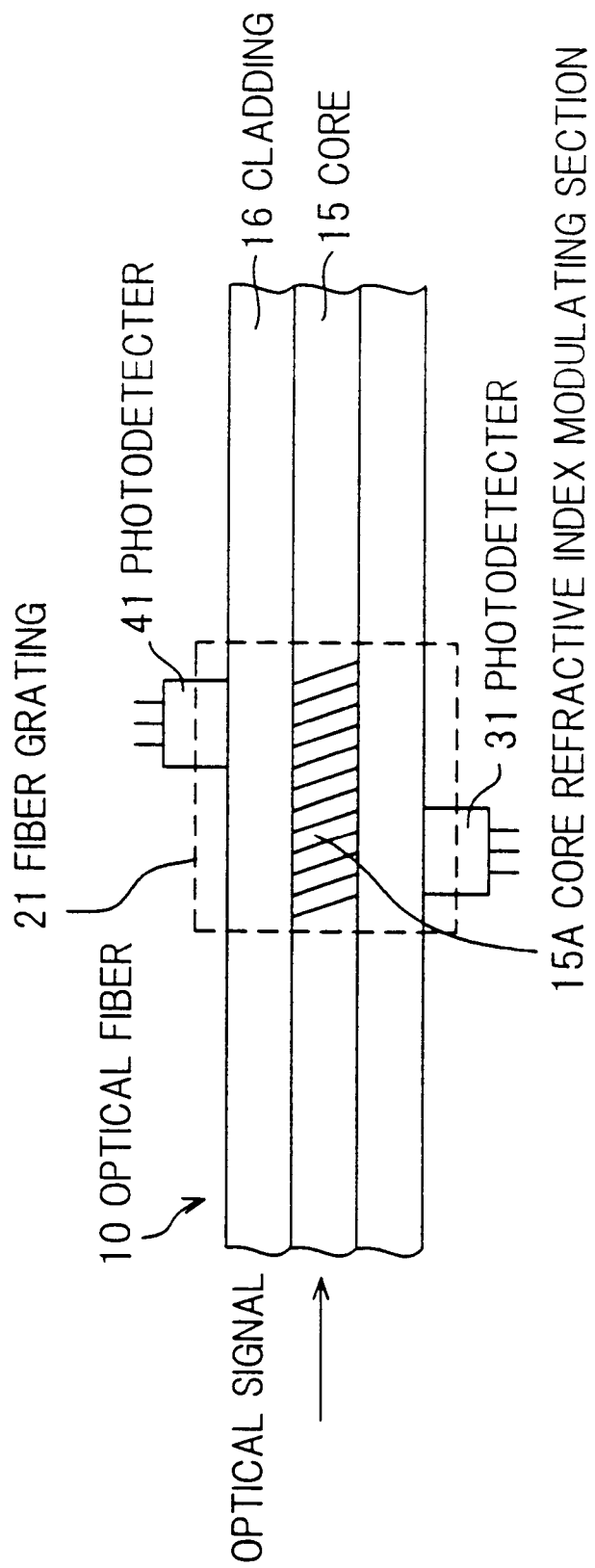
FIG. 2 is an explanatory view showing a line monitor according to a preferred embodiment of the invention.

In FIG. 2, an optical line monitor comprises: an optical fiber 10; a fiber grating 21, with a periodically varied refractive index, provided in a part of the optical fiber 10; and photodetectors 31, 41 for receiving an optical signal reflected from the fiber grating 21.

As described above, the light reflected from the fiber grating 21 is radiated to the side face of the fiber and received by the photodetectors 31 and 41 disposed in the vicinity of the side face of the fiber.

The fiber grating 21 functions to reflect a light having a specific wavelength. In particular, the grating is provided so as to incline against the axis orthogonal to the central axis of the optical fiber 10, thereby forming a core refractive index modulating section 15A. Therefore, receiving, by the photodetectors 31, 41, of light reflected from the fiber grating 21 toward the side face of the optical fiber enables the optical signal to be monitored.

The fiber grating 21 comprises germanium added to and periodically diffused in a core 15 to vary the refractive index. In this fiber grating 21, a special laser beam (for example, ultraviolet light) is applied to cause the refractive index of the core 15 to be periodically varied, thereby forming a Bragg diffraction grating capable of reflecting a particular wavelength component. In particular, in this fiber grating 21, the grating is provided so as to incline against the axis orthogonal to the central axis of the optical fiber 10, and the reflected light is radiated toward the side face of the fiber. A part of the light satisfying the Bragg's condition is radiated as leaked light by the grating from the core 15 towards a cladding 16, that is, toward the side face of the fiber. Therefore, construction of the grating so as for the signal light wavelength to be reflected and receiving of the leaked light by the photodetector 31 permit the output signal light level to be monitored.

When the optical signal, which has traveled straight through the fiber grating 21, is returned from an output end 12 and again entered the fiber grating 21 as returned light, the returned light is radiated toward the side face of the fiber opposite to that in the above output monitor. In this case, receiving this reflected light by the photodetector 41 can provide a reflection monitor.

According to the line monitor of the present invention, the monitor light is extracted while carrying out wavelength selection by the fiber grating, making it possible to precisely monitor only a light with a specific wavelength.

Preferred embodiments of an optical amplification apparatus using the line monitor of the present invention will be explained.

Figure 3:
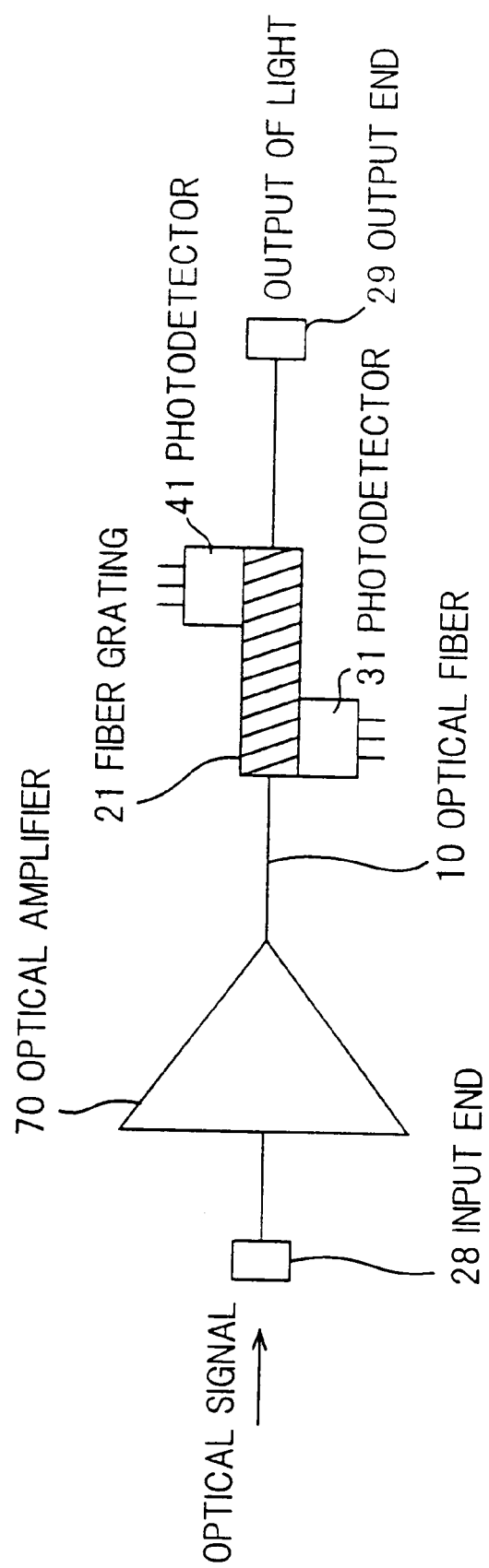
FIG. 3 is an explanatory view showing an optical amplification apparatus using a line monitor according to one preferred embodiment of the invention.

FIG. 3 is a diagram showing the construction of one preferred embodiment of an optical amplification apparatus using the line monitor of the present invention. In FIG. 3, numeral 28 designates an input end, numeral 10 an optical fiber, numeral 21 a fiber grating, numeral 70 an optical amplifier, numerals 31, 41 each a photodetector, and numeral 29 an output end.

The optical amplifier 70 functions to amplify an input optical signal. The line monitor of the present invention is disposed behind the optical amplifier 70. The optical signal amplified by the optical amplifier 70 enters the input end 28 of the fiber grating 21. The line monitor is the same as described above in connection with FIG. 2.

The output of light amplified by the optical amplifier 70 is monitored by the line monitor of the present invention, and the monitoring is utilized for control of the gain of the optical amplifier 70. According to the line monitor of the present invention, selection of the wavelength in the monitoring is carried out using the fiber grating. Therefore, that the wavelength is selected so as to conform to that of the amplified light output from the optical amplifier 70 permits the output of only a contemplated light to be precisely monitored.

In particular, at the time of amplification, spontaneously emitted light is incorporated in the light output from the optical amplifier. Therefore, extraction and monitoring of the wavelength of the contemplated original signal light are indispensable for precisely controlling the optical amplification. Use of the line monitor according to the present invention enables the monitoring to be carried out while selecting the wavelength and hence can satisfy the above requirement. Further, the size of the whole optical amplification apparatus having the monitoring function can be reduced.

Another preferred embodiment of an optical amplification apparatus using the line monitor of the present invention will be explained in conjunction with FIG. 4.

Figure 4:
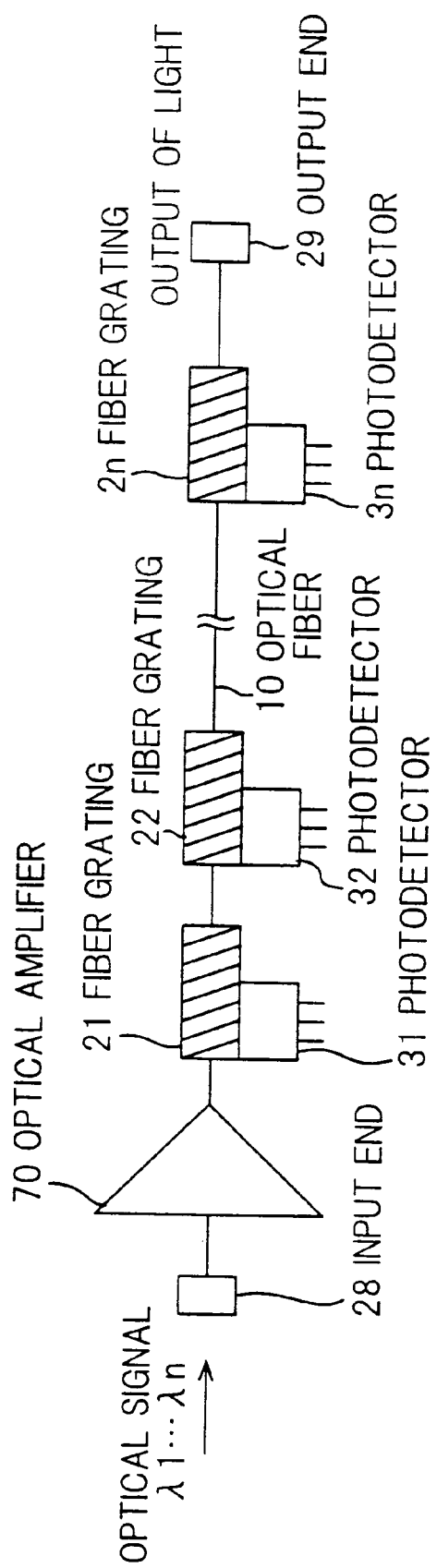
FIG. 4 is an explanatory view showing an optical amplification apparatus ing a line monitor according to another preferred embodiment of the invention.

In FIG. 4, numeral 28 designates an input end, numeral 70 an optical amplifier, numeral 21 a fiber grating, numerals 31, 32, 3n each a photodetector, numeral 22, 2n each a fiber grating, and numeral 29 an output end.

In FIG. 4, a plurality of line monitors 31, 32 . . . 3n of the present invention are connected in a cascade form behind the optical amplifier 70. Also in this case, each of the line monitors comprises: an optical fiber 10; a fiber grating 21, with a periodically varied refractive index, provided in a part of the optical fiber 10; and photodetectors 31, 41 for receiving an optical signal reflected from the fiber grating 21. The line monitors are different from each other in wavelength of the light to be monitored.

Specifically, the line monitor 31 can monitor light having wavelength λ1, and the line monitor 32 can monitor light having wavelength λ2.

The optical signal amplified by the optical amplifier 70 enters the input end 28 of the fiber grating 21. As with the line monitor described above, the fiber grating 21 comprises germanium added to and periodically diffused in the core to vary the refractive index.

In this case, the period in a periodical change in refractive index provided in the core of the grating 21 is shifted from that in the core of the other gratings. This permits the wavelength of the light to be reflected and monitored to be different from that in the other line monitors. Specifically, in the amplified light, a part of light having a wavelength satisfying the Bragg's condition in each line monitor is radiated toward the side face of the fiber by the grating as light leaked from the core to the cladding, and only leaked light satisfying a certain condition, such as an optical signal in its component having wavelength λ1, is received by the photodetector 31 or the like. At that time, the wavelength components not satisfying the condition are traveled straight and enter the fiber grating 22 disposed in tandem with the fiber grating 21. In the fiber grating 22, as with the fiber grating 21, only a wavelength component 2 satisfying a condition is reflected and received by the photodetector 32.

Thus, in the plurality of wavelength components contained in the amplified light, only the respective corresponding wavelength components are selectively extracted and monitored. Thus, in the case of multi-wavelength amplification with the number of wavelengths being n, a signal light component λn is reflected in a fiber grating (2n) corresponding to the wavelength and received by a photodetector (3n).

The above constitution is suitable as a monitor for an optical amplification apparatus for wavelength multiplexing transmission wherein a plurality of signal lights with different wavelengths are multiplexed, amplified at a time and transmitted.

As described above, the line monitor of the present invention uses a fiber grating which permits reflected light to be radiated toward the side face of an optical fiber. Therefore, only an optical signal having a specific wavelength can be detected, and only the contemplated original optical signal can be precisely monitored. Further, when a plurality of optical signals are input in a wavelength multiplexed state, the optical signals with respective wavelengths can be monitored independently of each other, realizing precise wavelength detection.

In addition, the number of parts constituting the line monitor can be reduced. Further, since no optical branching device is used, the size of the line monitor can be reduced. Furthermore, good connectability of the fiber grating to the optical fiber can contribute to lowered loss.

The invention has been described in detail with particular reference to preferred embodiments, but it will be understood that variations and modifications can be effected within the scope of the present invention as set forth in the appended claims.

What is claimed is:

1. A line monitor comprising:
   an optical signal input section for permitting an optical signal to be input;
   optical signal output means for outputting an optical signal;
   a fiber grating including a section with a periodically varied refractive index, the optical signal, which has entered the section with a periodically varied refractive index, in its component with a predetermined specific wavelength being reflected while the remaining component of the optical signal is output from the optical signal output means;
   first optical signal withdrawal means for allowing the optical signal in its component with a specific wavelength to withdraw into the outside of the fiber grating; and
   photoelectric conversion means for converting the optical signal in its component with a specific wavelength taken out from the first optical signal withdrawal means to an electric signal.

2. The line monitor according to claim 1, further comprising:
   second optical signal withdrawal means for allowing the optical signal in its remaining component to withdraw into the outside of the fiber grating; and
   photoelectric conversion means for converting the optical signal in its component taken out from the second optical signal withdrawal means to an electric signal and outputting the electric signal.

3. The line monitor according to claim 2, wherein the first optical signal withdrawal means is such that
   the section with a periodically varied refractive index is provided so as to incline against the central axis of the fiber grating and
   the optical signal in its component with a specific wavelength is radiated from the side face of the fiber grating to take out the optical signal in its component with a specific wavelength.

4. The line monitor according to claim 1, wherein the first optical signal withdrawal means is such that
   the section with a periodically varied refractive index is provided so as to incline against the central axis of the fiber grating and
   the optical signal in its component with a specific wavelength is radiated from the side face of the fiber grating to take out the optical signal in its component with a specific wavelength.

5. The line monitor according to claim 4, wherein a plurality of the fiber gratings and
   a plurality of the first optical signal withdrawal means corresponding respectively to the fiber gratings are provided and
   the wavelength components taken out from the plurality of the first optical signal withdrawal means are different from each other.

6. The line monitor according to claim 1, wherein a plurality of the fiber gratings and
   a plurality of the first optical signal withdrawal means corresponding respectively to the fiber gratings are provided and
   the wavelength components of the light taken out from the plurality of the first optical signal withdrawal means are different from each other.

7. An optical amplification apparatus comprising:
   an optical amplifier for amplifying an input optical signal containing light with a specific central wavelength and outputting the amplified optical signal;
   a line monitor for permitting the amplified optical signal to be input, taking out the light with a specific central wavelength from the amplified optical signal, and converting the light with a specific central wavelength to an electric signal, said line monitor comprising an optical signal input section for permitting an optical signal to be input, optical signal output means for outputting an optical signal, a fiber grating including a section with a periodically varied refractive index, the optical signal, which has entered the section with a periodically varied refractive index, in its component with a predetermined specific wavelength being reflected while the remaining component of the optical signal is output from the optical signal output means, first optical signal withdrawal means for allowing the optical signal in its component with a specific wavelength to withdraw into the outside of the fiber grating, and photoelectric conversion means for converting the optical signal in its component with a specific wavelength taken out from the first optical signal withdrawal means to an electric signal; and
   optical amplifier control means for controlling the gain of the optical amplification apparatus based on the electrical signal.

8. The optical amplification apparatus according to claim 7, wherein said line monitor further comprises:

second optical signal withdrawal means for allowing the optical signal in its remaining portions to withdraw into the outside of the fiber grating; and photoelectric conversion means for converting the optical signal in its component taken out from the second optical signal withdrawal means to an electric signal and outputting the electric signal.

9. The optical amplification apparatus according to claim 8, wherein the first optical signal withdrawal means is such that the section with a periodically varied refractive index is provided so as to incline against the central axis of the fiber grating and the optical signal in its component with a specific wavelength is radiated from the side face of the fiber grating to take out the optical signal in its component with a specific wavelength.

10. The optical amplification apparatus according to claim 7, wherein the first optical signal withdrawal means is such that the section with a periodically varied refractive index is provided so as to incline against the central axis of the fiber grating and the optical signal in its component with a specific wavelength is radiated from the side face of the fiber grating to take out the optical signal in its component with a specific wavelength.

11. An optical amplification apparatus comprising:

an optical amplifier for amplifying an input multiplexed optical signal containing a plurality of lights with different central wavelengths and outputting an amplified, multiplexed optical signal;

a line monitor for permitting the amplified optical signal to be input, taking out the lights with the respective central wavelengths in the amplified, multiplexed optical signal from respective fiber gratings, and converting the lights to respective electric signals, said line monitor comprising a plurality of fiber gratings and a plurality of first optical signal withdrawal means corresponding respectively to the fiber gratings, the wavelength components taken out from the plurality of the first optical signal withdrawal means being different from each other; and optical amplifier control means for controlling the gain of the optical amplification apparatus based on the electrical signals output from the line monitor.

* * * * *

UNITED STATES PATENT AND TRADEMARK OFFICE
CERTIFICATE OF CORRECTION

PATENT NO. : 5,974,212
DATED : October 26, 1999
INVENTOR(S) : Miwa Saeki

It is certified that error appears in the above-identified patent and that said Letters Patent is hereby corrected as shown below: On the title page:

Item: [56] U.S. References 5,337,382: "8/1994" should read --8/1994--
Column 1, Line 54: "parts" should read --parts.--

Signed and Sealed this

Second Day of January, 2001

Attest:

Attesting Officer

Q. TODD DICKINSON
Commissioner of Patents and Trademarks